(12) United States Patent
Saxena et al.

(10) Patent No.: US 9,015,235 B2
(45) Date of Patent: Apr. 21, 2015

(54) SERVER AGGREGATED APPLICATION STREAMING

(71) Applicant: Antecea, Inc., Cambridge, MA (US)

(72) Inventors: Anurekh Saxena, Newcastle, WA (US); Hariharan Subramanian, Wakefield, MA (US); Tejasvi Aswathanarayana, Salem, NH (US); Joseph Rafail, Sewickley, PA (US)

(73) Assignee: Antecea, Inc., Cambridge, MA (US)

( * ) Notice: Subject to any disclaimer, the term of this patent is extended or adjusted under 35 U.S.C. 154(b) by 236 days.

(21) Appl. No.: 13/740,988

(22) Filed: Jan. 14, 2013

(65) Prior Publication Data

US 2014/0032644 A1    Jan. 30, 2014

Related U.S. Application Data

(60) Provisional application No. 61/586,304, filed on Jan. 13, 2012.

(51) Int. Cl.
| | |
|---|---|
| *G06F 15/16* | (2006.01) |
| *G06F 15/173* | (2006.01) |
| *G06Q 10/10* | (2012.01) |
| *G06F 9/50* | (2006.01) |
| *H04L 12/24* | (2006.01) |
| *H04L 29/08* | (2006.01) |

(52) U.S. Cl.
CPC ............... *H04L 67/10* (2013.01); *G06Q 10/10* (2013.01); *H04L 67/16* (2013.01); *H04L 67/08* (2013.01); *G06F 9/5055* (2013.01); *G06F 9/5072* (2013.01); *H04L 67/04* (2013.01); *G06F 2209/549* (2013.01); *H04L 41/5025* (2013.01)

(58) Field of Classification Search
USPC .......... 709/203, 227, 202, 224, 221, 217, 223, 709/204, 243, 245, 213
See application file for complete search history.

(56) References Cited

U.S. PATENT DOCUMENTS

| | | | |
|---|---|---|---|
| 8,010,947 B2 * | 8/2011 | Carbone et al. ............... 717/121 |
| 8,516,046 B1 * | 8/2013 | Xu ................. 709/204 |
| 8,650,305 B2 * | 2/2014 | Booth et al. ................ 709/227 |
| 2006/0168107 A1 | 7/2006 | Balan et al. |
| 2009/0049525 A1 | 2/2009 | D'Angelo et al. |
| 2009/0089406 A1 | 4/2009 | Roush et al. |
| 2009/0210870 A1 * | 8/2009 | Clark et al. .................. 717/178 |
| 2010/0023582 A1 | 1/2010 | Pedersen et al. |
| 2010/0131626 A1 * | 5/2010 | Oda et al. ....................... 709/221 |
| 2011/0173251 A1 | 7/2011 | Sandhu et al. |
| 2012/0131323 A1 * | 5/2012 | Gattegno et al. ................ 713/2 |
| 2012/0278439 A1 | 11/2012 | Ahiska et al. |

* cited by examiner

*Primary Examiner* — Jude Jean Gilles
(74) *Attorney, Agent, or Firm* — Fox Rothschild LLP; Dennis M. Carleton

(57) ABSTRACT

A software-implemented method which allows the streaming of applications from a server or cluster of server to one or more clients, typically mobile devices. The invention also enables the sharing, through a social network cloud service, of applications located on connected computers or on the cloud. When applications are streamed to mobile devices, the user interface of the application may be modified to fit the native user interface of the device.

20 Claims, 13 Drawing Sheets

DESKTOP COMPUTER

MOBILE DEVICE

SERVER AGGREGATED APPLICATION STREAMING

RELATED APPLICATIONS

This application claims the benefit us U.S. Provisional Application Ser. No. 61/586,304, filed Jan. 13, 2012.

BACKGROUND

Remote access to the desktop environment of a computer is well known in the art and many facilities are available to enable this functionality. Current implementations of this functionality allow remote access to the desktop of a computer via another computer, typically having the same or similar display screen and user interfaces (i.e., mouse and keyboard) for purposes of running applications on the remotely-accessed computer or to provide technical support to the remotely-accessed computer.

It is also desirable to be able to remotely access a computer via a mobile device, for example an iPhone or iPad running the iOS operating system, and implementations are available to stream the desktop of a computer to a mobile device running iOS. Traditional remote desktop applications on mobile devices minor the display of a remote computer and provide simulation for mouse and keyboard events. This provides a challenge on smaller embedded devices where screen size is limited and these devices generally do not have external mouse or keyboards.

However, such implementations can be awkward due to the differences in the display and user interfaces of the devices. For example, when the entire desktop is streamed, windows typically appear much smaller on an iOS device because of the differences in the screen sizes between the remotely-accessed system and the iOS device, often rendering their contents unreadable. Additionally, mouse-like functions on an iOS device are typically provided via finger gestures made directly on the screen. As such, the context provided by a mouse with left and right buttons is missing and it is difficult to provide the same functionality as is available with a mouse having left and right buttons. For example, to move a window requires left-clicking the banner of the window, dragging the mouse to a new location, and releasing the left button. Likewise, clicking the right mouse button will typically bring up a contextual menu. Some applications on Apple's iOS platform use the finger gestures to simulate mouse actions, however, some mouse operations are difficult using the finger gestures available on an iOS device.

It would therefore be desirable to provide a facility allowing remote access to resources on remote systems which alleviate the deficiencies noted above, namely small displays on mobile devices and the difficulty of interacting with a remote system without the benefit of a mouse or keyboard.

SUMMARY OF THE INVENTION

The present invention allows for the remote access of one or more remote computers via one of three methods: desktop streaming, application streaming or window streaming. A user may enable one or more computers as servers which allow remote access via a mobile device, for example, an iPhone or iPad running the iOS operating system (the "client"). These remote computers and the applications they have available appear as a single aggregated view acting as a single virtual computer on the client with which it interacts. Additionally, server resources may be grouped together to form clusters, allowing transparent access over all nodes in the cluster. Note that, although the invention is presented in the context of the use of a mobile device as the client, any computer could be used as the client.

Each computer which is a member of the designated cluster runs server software which provides the functionality of the present invention. If a cluster of servers has been formed, one of the nodes will be appointed as the master node. The master node will engage in a discovery process which determines what applications are available on each member of the cluster for remote access via streaming.

The design described below simplifies remote desktop access by identifying the components the users most care about (applications, data, windows) and provides a native (for the mobile device) interface to their desktop when applicable.

Application streaming is based on the idea that users access their desktop from a mobile device to do one or more of the following: (1) Interact with an application that is running on their computer. This could be something as simple as viewing a movie or viewing a PDF file. It could also involve using applications that are not available on mobile devices like complex graphics applications; or (2) Manage applications on a desktop computer (start and stop applications, interact with application menus and user interface elements etc).

There are two software applications required for this design. First, there is an application running on the desktop computer(s) that the user wishes to control. This application will be referred to henceforth as the "server". Second, these is an application running on the mobile device that will connect to the server with the intention of viewing and controlling applications on the server. This application will be referred to henceforth as the "client".

The server and client applications connect via a network interface (Direct TCP/UDP or via a cloud service) as shown in FIG. 1.

The server(s) will perform an application discovery process and the client will receive a list of applications available for remote access from all computers in the cluster and may or may not know which computer in the cluster will be providing the desired service. Preferably, all available applications served by computers in the cluster will appear in a native manner on the client's user interface. For example, if the user is remotely accessing the cluster via an iOS device, the selection of available applications may appear as icons on the user interface, Alternatively, the list of applications offered by the server may appear as a list which is available from a single app.

To start the remote application running on one of the computers in the cluster, the user will select the appropriate icon, or may search for a data file (for example, a WORD doc, an Excel file, a PDF file, a JPG file, etc.) which requires the running of a particular application and may select the document. The document will preferably be searched for using the user interface (UI) provided natively on mobile device, and may reside on the client or on any one of the remotely accessed computers in the cluster.

The running of the selected application on one of the computers in the cluster is preferably transparent to the user. That is, if two or more of the computers offer the same application, one will be selected by the server software based on a set of collected heuristics or metrics to optimize for best performance, lowest cost, greatest storage capacity or other value-added aspects offered by the server. Applications may be presented to the user based on various criteria, such as load balancing, the user's level of service, or offering of a server running a specific application that can manipulate or view that file using features or services the user may prefer or the server wishes to present to the user based on the heuristics.

As previously mentioned, the user may access the application in one of three modes. The first mode is desktop streaming, in which the entire desktop of the remote computer which is serving the application is shown. This is the mode offered by many prior art implementations of remote desktop access. The second mode is application streaming mode, in which a desktop showing only the windows of the selected application. The third mode is window streaming mode, in which only the active window of the selected application is shown. The mode of access is preferably selectable by the user or settable as a parameter of the cluster.

The server software preferably monitors the priority of windows appearing on computers in the cluster to ensure that the remote user only sees the appropriate windows, which may or may not include access to modal windows which may appear from time to time with a higher priority than the application window being access by the user.

Access to specific applications on the cluster is controlled via traditional security protocols, such as username/password combinations, although any known method of controlling access may be used. Access may be allowed to all applications and all documents, or may be restricted to specific applications and documents. Multiple users may remotely access the cluster simultaneously.

In another aspect of the invention, applications may be streamed from a central cluster server to users, potentially for a fee. This is useful if the user has a document but does not have access to the proper application to open the document or does not have his own remote computers that can act as servers. For example, the user receives a PDF file in an email but does not have the proper reader installed on his remotely accessible cluster. In such a case, the application may be streamed from a commercial cluster. This can be based on a per view basis, per application launch, or for a period of time based on subscription or an access key provided.

DETAILED DESCRIPTION OF THE INVENTION

The invention will be described in five subsections, which include (1) Application Discovery; (2) Application Monitoring; (3) Windows Monitoring; (4) Application Streaming; and (5) Aggregation.

Figure 1:
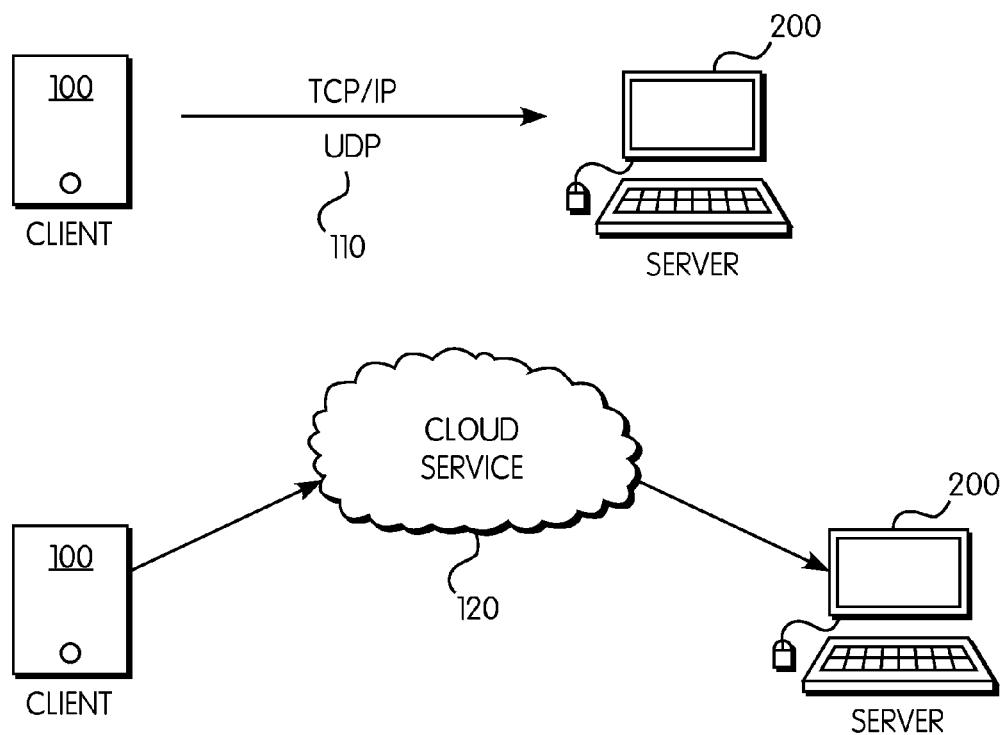
FIG. 1 shows two different topologies under which the invention may be used.

FIG. 1 shows the various ways in which a client may access the server(s).

Preferably, the user can establish a peer to peer connection via TCP/IP or UDP, with a server node 200 in a cluster of servers. If client 100 is unable to establish peer to peer service with a server 200, it is possible to use a cloud relay server 120 to perform the connection. If the service is established via cloud relay server 120, a fee may apply.

Application Discovery Application discovery provides a mechanism that extracts a list of applications from a server of from a cluster of servers. The server will generate this list from the operating system and send it to the client for display using the native user interface of the mobile device.

Figure 2:
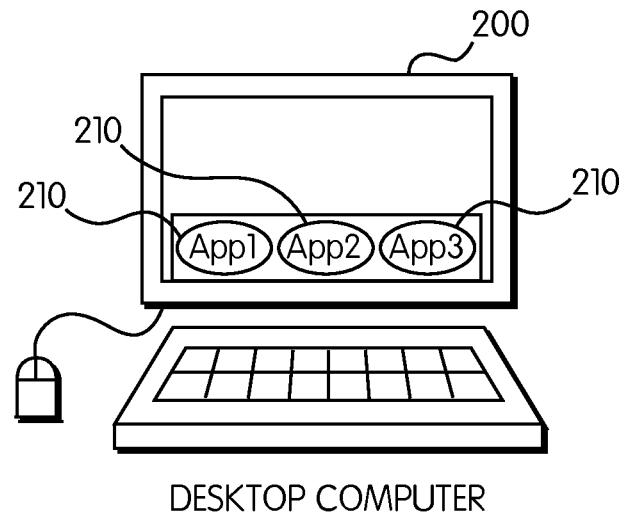
FIG. 2 shows the desktop computer having applications running configured to accept requests from clients.
Figure 3:
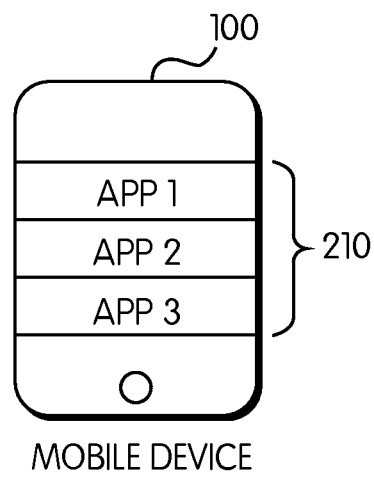
FIG. 3 shows a mobile device showing the available applications on the desktop computer of FIG. 2.

FIGS. 2 and 3 show an example of a desktop computer that has applications 210 (App1, App2, App3) installed locally. When a user is using the computer locally, they would typically navigate their mouse to where the application can be launched (for example, from a dock on an OSX system or a start menu on Windows system or by navigating the file system). In the present invention, server 200 will send the list of applications to client 100 so it can display them to the user in the native interface of the mobile device. The client will then send a request to server 200 to perform an action based on the selection of the user. The action can be, for example, "Open" or "Launch", "Close" or "Kill", "Activate" (bring up all the windows for the application), etc.

Figure 4:
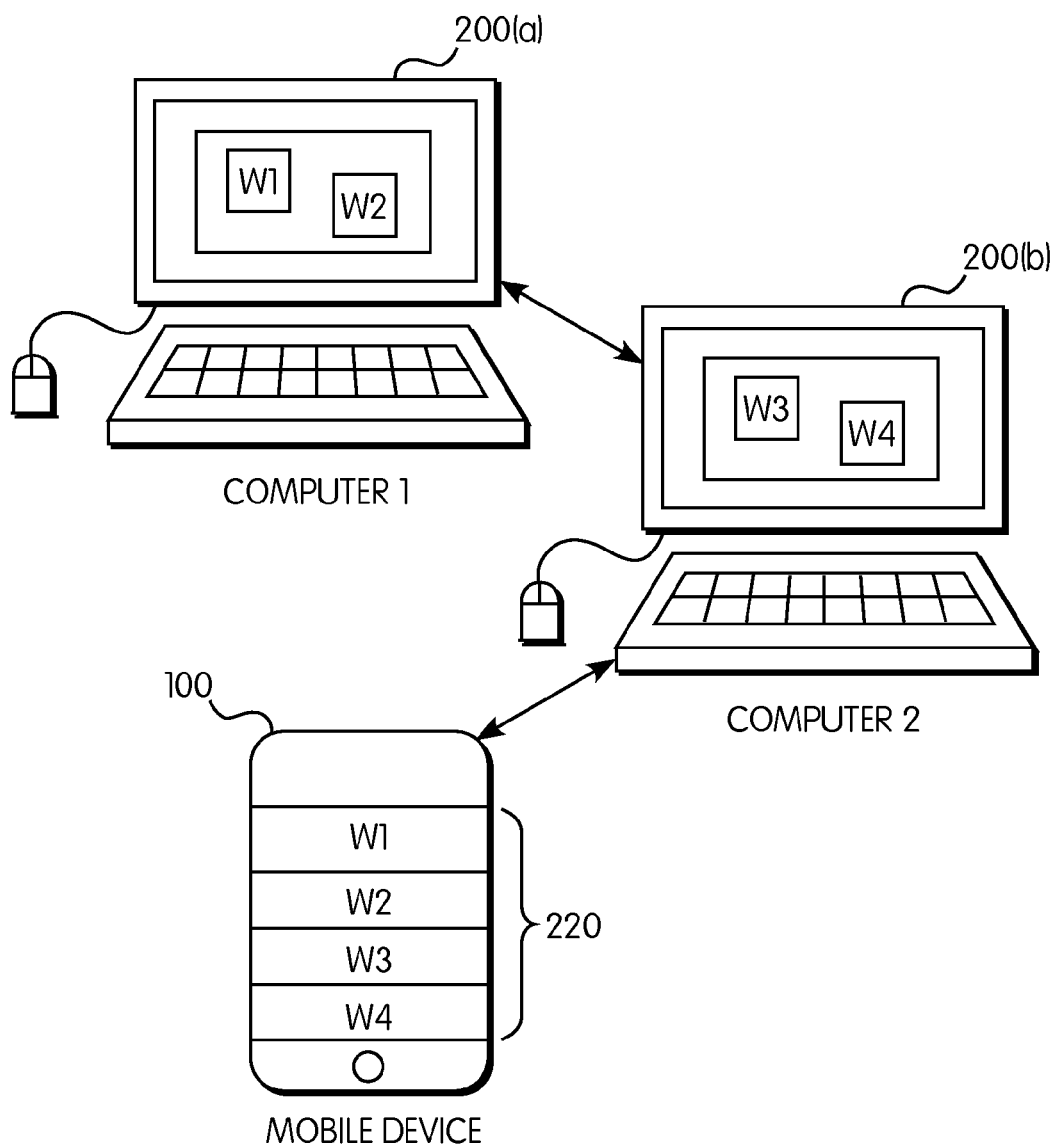
FIG. 4 shows a cluster of two server computers and a mobile device accessing the cluster showing windows streaming mode.

As an example, in FIG. 4, client 100 has selected an IM application. Two nodes in the users cluster, 200(a) and 200(b), are running the IM application and have windows W1, W2, W3 and W4, labeled 220 in FIG. 4, open. In this case, on the user interface of client 100 after the IM application has been selected, the windows which are assigned to the IM application are listed. The user may select one of the windows to appear on the user interface of client 100.

Figure 5:
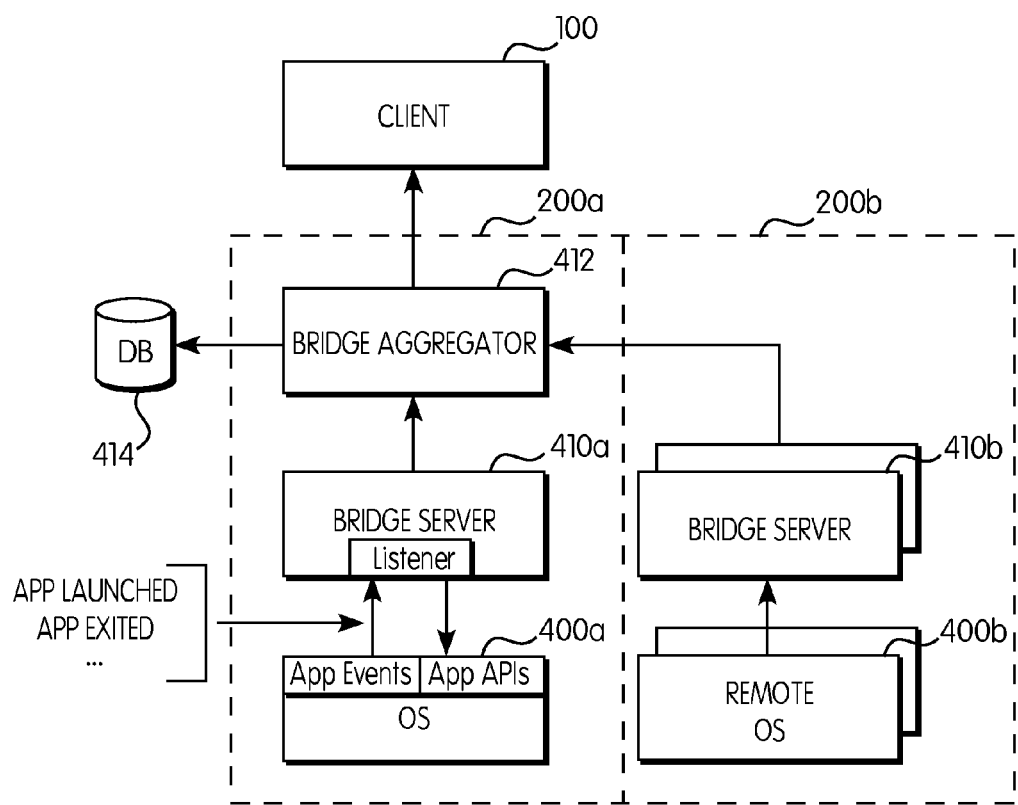
FIG. 5 is a block diagram, showing the basic components of the invention.

The application discovery process can be explained with reference to FIG. 5. For each server 200a, 200b . . . in the cluster, a bridge server 410 communicates with operating system 400 to keep track of applications that are launched or killed. Bridge server 410 identifies running applications as being relevant to a remote desktop client 100 if the following requirements are met:

1. The application has one or more window owned by it;
2. There is at least one window that is on the desktop screen and has a non-zero width and height; and
3. The window has valid content.

Bridge server 410 monitors recently launched applications and provides that information to client 100. In addition, bridge server 410 can monitor recently launched documents etc. and provide a list of those to client 100.

Figure 6:
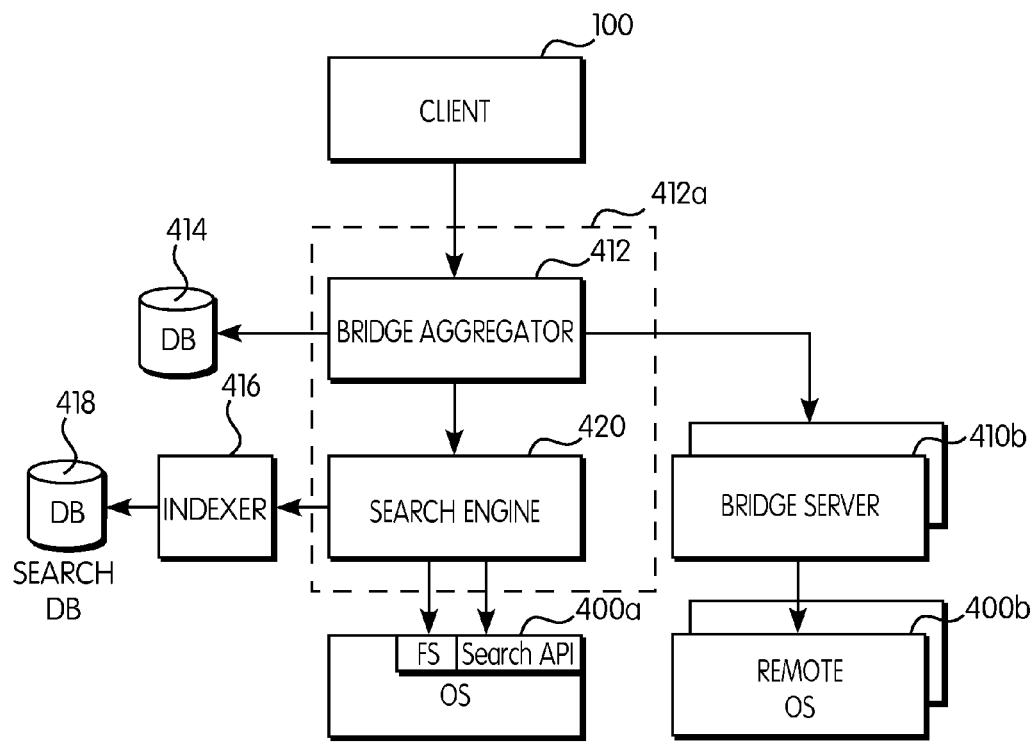
FIG. 6 shows additional components implementing a search function.

A search protocol between bridge server 410 and client 100 gives client 100 the ability to search for applications or documents on the remote desktop and launch it from the mobile device. FIG. 6 shows the components that implements the search function. Each bridge server 410a, 410b . . . has a search engine capability 420 built in that allows searching on the local system for application and documents, in response to search queries entered by a user on client 100. Results of the search on each bridge server 410*a*, 410*b* . . . are indexed by indexer 416 on the master node 200*a* and the results are stored in search database 418.

Figure 7:
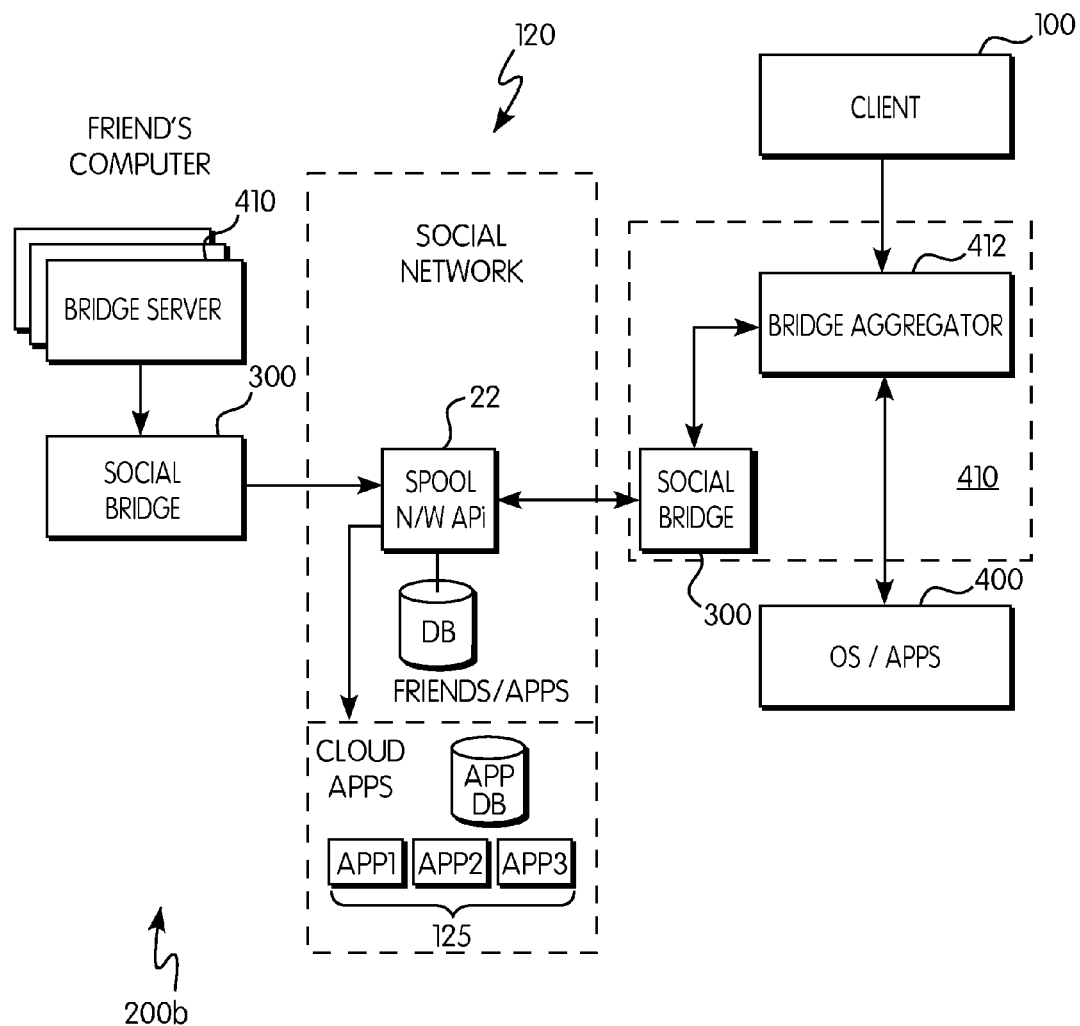
FIG. 7 shows the interaction of the invention with a social networking cloud to facilitate various functions and configurations of the invention.

FIG. 1 showed two possible means of connecting client 100 to server 200. One is via a peer-to-per connection and the other was though a cloud service that "introduced" the client to the server and which may or may not relay communication between the client 010 and server 200. The cloud functionality is shown in more detail as social network 120 in FIG. 7. The social network 120 allows the aggregation an discovery of servers 200*a*, 200*b* . . . through the cloud and also allows the connection of client 100 to one or more aggregated servers (not shown). In addition, social network 120 allows the serving of cloud applications 125 to client 100 connected directly thereto or through a bridge server 410.

To facilitate communications with and through the social network 120, each bridge server 410 runs a social bridge 300 which is able to access services available on social network 120 via a social network API 122. Social network API 122 facilitates the communications between bridge servers 410 and also facilitates the aggregation of cloud applications 125 by bridge aggregator 412 for serving to client 100.

Social network 120 also facilitates the sharing of an application on one computer with "friends" located on other computers running the bridge servers 410. The applications are presented as part of a virtual desktop on the user's computer. In some use cases, a social network may be leveraged to identify friends with whom applications can be shared. In cases where the vendor of the application imposes licensing or usage restrictions on the application, the application may be made available for sharing only when the application owner is not using the computer that hosts the application or not using the application itself.

Application Monitoring Application monitoring and quality of service (QoS) software monitors resource utilization of the various applications running on the server and automatically throttles their resource usage to optimize the remote desktop experience and to ensure a specified level of QoS for a streaming application. The throttling is based on tracking parameters that include but not limited to:

1. The Number of active windows of the application;
2. CPU utilization;
3. Memory utilization; and
4. Network bandwidth.

Figure 8:
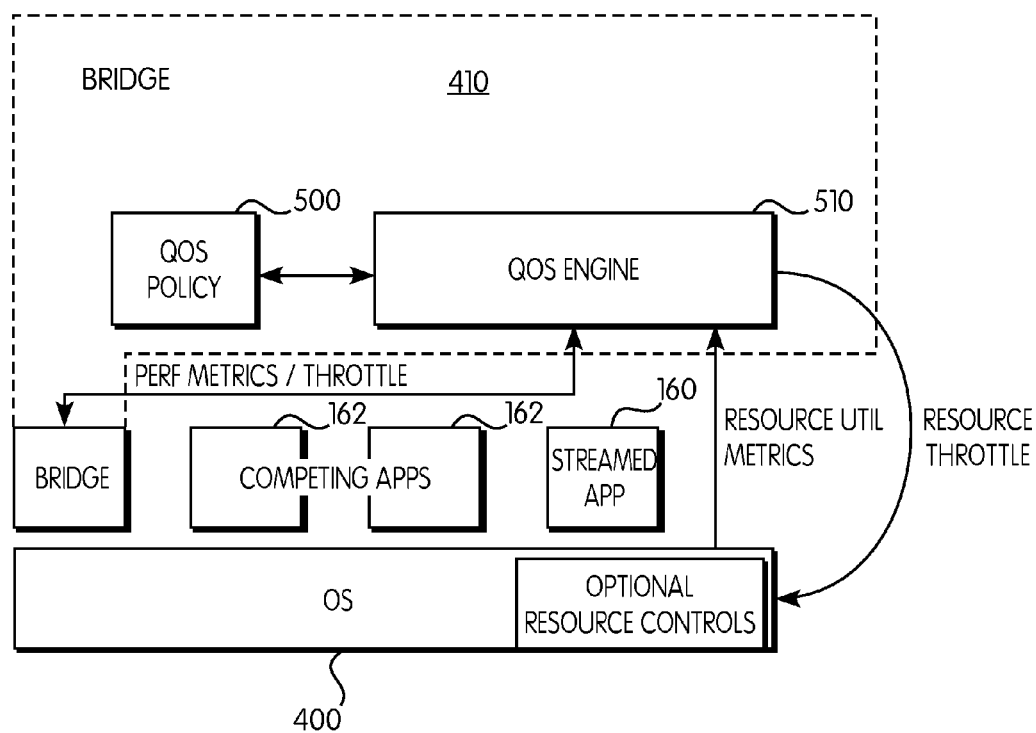
FIG. 8 shows components implementing the quality of service features of the invention.

The QoS features are shown in FIG. 8. Bridge server 410 includes a QoS engine which monitors resource utilization of the streamed apps 160 as well as competing apps 162. The server also stores QoS policy 500 supplied by the user. QoS engine 510 uses the resource utilization metrics obtained from the OS 400 and performance reported by the App streaming component of bridge server 410 to make QoS throttling decisions. It then uses the resource throttles supplied by the OS or the custom module to enforce the QoS decisions.

As an example of the use of the QoS features of the invention, bridge server 410 may identify any application that is causing a degradation of the QoS of the application streaming, for example, a periodic backup process, and temporarily throttle it's resource consumption using an API provided by OS 400 (not shown).

Figure 9:
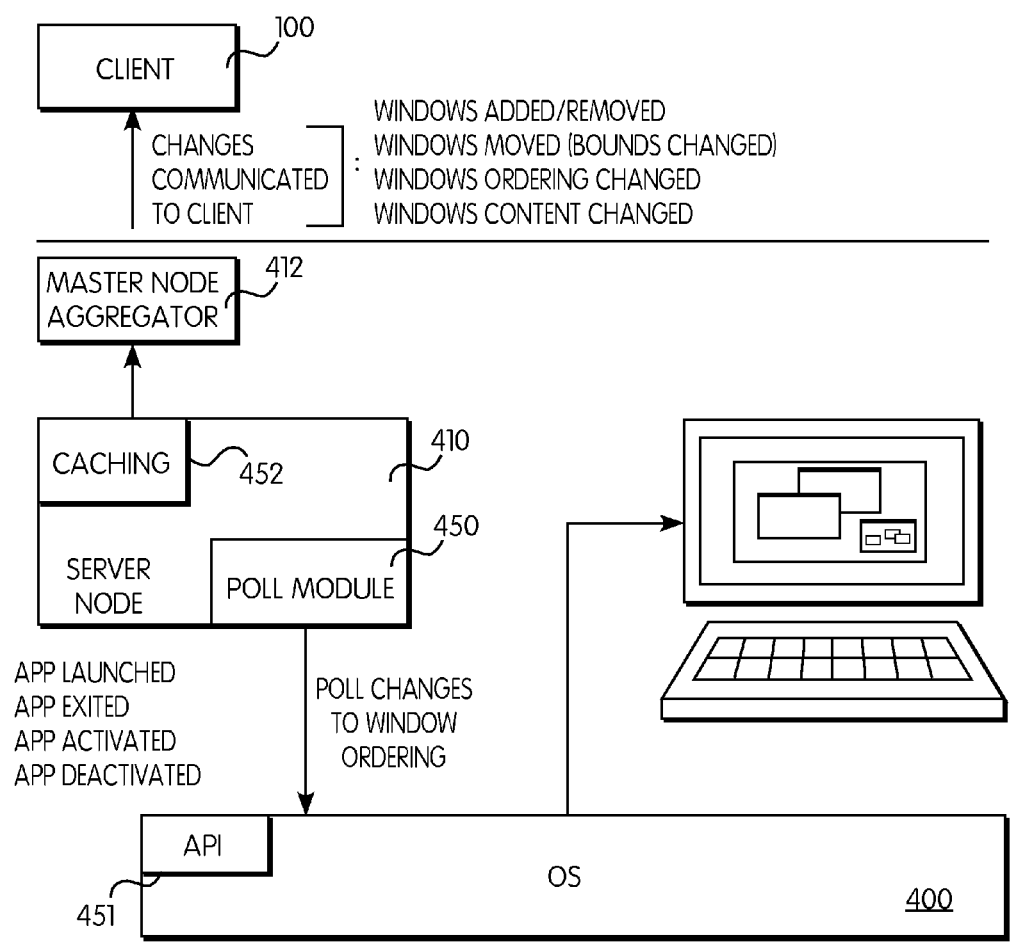
FIG. 9 shows components implementing the widow monitoring features of the invention.

Window Monitoring Window monitoring provides mechanisms to get individual windows, group windows by application and virtualize the displaying of and inputs to windows. The window monitoring features of the invention are shown in FIG. 9. Bridge server 410 monitors all the windows in the system and notifies client 100 whenever one of the following changes:

1. A new window is added to the system or an old one is removed;.
2. A window's bounds change (Location, Size); or
3. The order of a window changes.

All windows in the system are stacked in the order of visibility from the top most windows (visible) to the ones in the back (hidden). However, asynchronous events that are generated with or without the user's control can change the order without the knowledge of the user. We provide a method that tracks any changes to the order of visibility of windows and communicates such changes to client 100. When available, operating system callbacks are used, otherwise, poll module 450 will periodically poll OS 400 for the state of windows using OS specific API 451 for window changes (implements the core of window monitoring). Older window states are cached 452 to determine if new changes need to be propagated. This helps reduce the amount of updates sent to client 100.

One applicable use case for tracking the window order is when the change in window order prevents the user from sending input to the window being streamed. This could be, for example, a modal window being displayed by an application that is currently not being streamed to the user but may require the user's attention. The client can then use the information provided by this method to take corrective action, which could be to display the new window to the user. There may also be a priority given to an application window by the user which enables the tracking of the window order to be changed as predominate or subordinate to the client.

Figure 10:
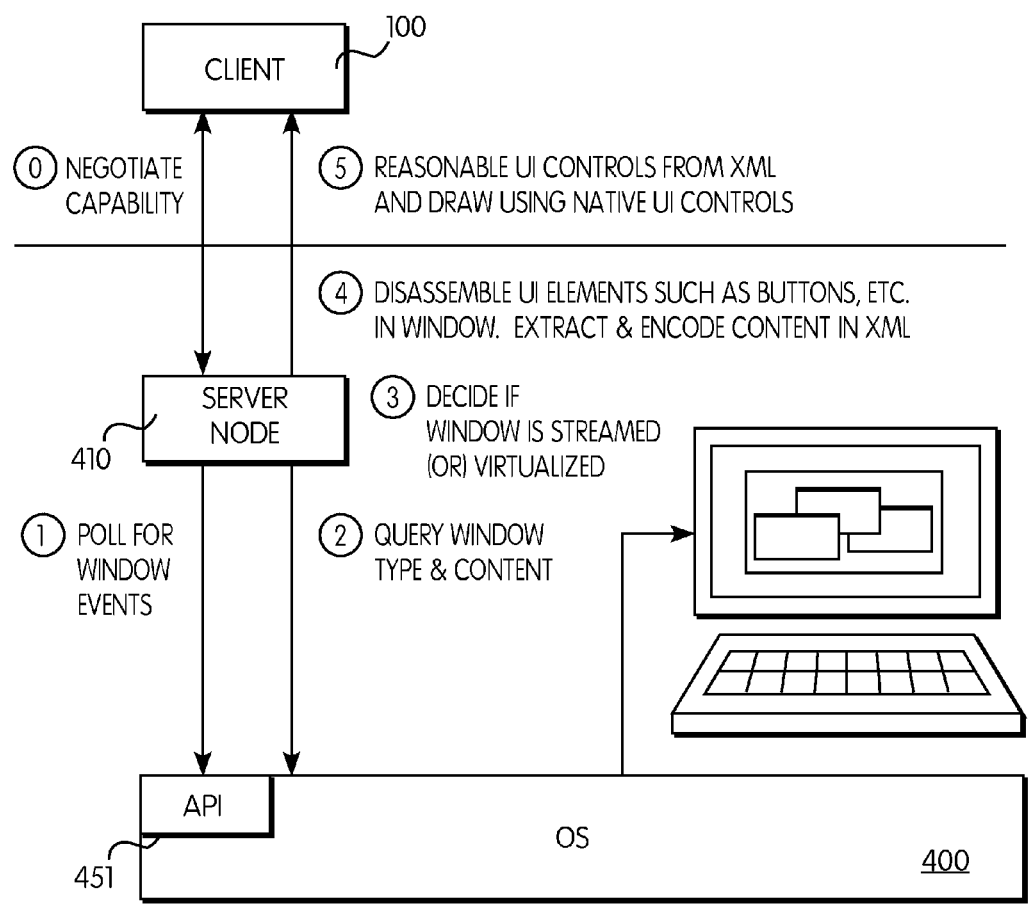
FIG. 10 shows components of the invention implementing the windows virtualization functions.
Figure 11:
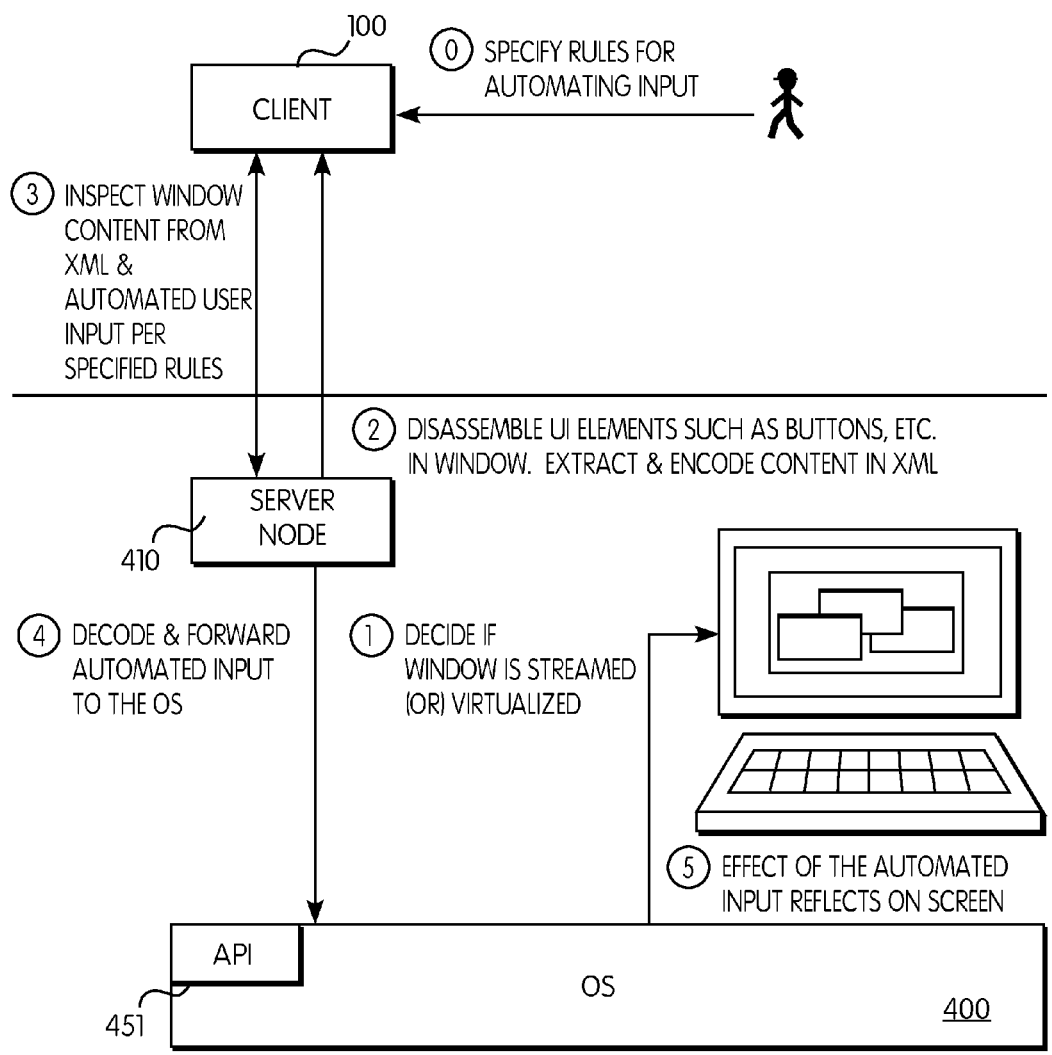
FIG. 11 shows additional components for allowing a client user to automate input for various windows.

Another aspect of the window monitoring function is shown in FIGS. 10 and 11 and provides a method for monitoring the type and content of window (Buttons, Text, etc.) and deciding if it is best displayed using UI controls that are native to the OS of client 100 or if it is better to stream the window as seen in the desktop. For example, the window could require text input from the user which could be more effectively displayed using native UI controls on the OS of client 100.

FIG. 10 describes the sequence of interactions between the client, server and OS that happen as part of UI virtualization in window monitoring. Bridge server 410 will poll OS 400 for window events, as previously discussed, and will also use API 451 to query for the window type and content. Bridge server 410 will then decide if the window should be streamed or virtualized. If the window is to be virtualized, the window is disassembled and the window elements encoded in XML. Client 100 then reassembles the XML using native user interface controls.

As shown in FIG. 11, the system also provides a method that allows the user to identify certain types of windows and associated content and permit client 100 to automatically provide predetermined inputs. For example, this could allow client 100 to auto populate user names, addresses and other such mundane inputs from a database in response to content monitored in windows. The user may specify rules for the automation function.

Application Streaming Application streaming provides mechanisms for clients to view, control and interact with applications that reside on a one or more servers instead of remote desktops. Client 100 is able to pick which application it wants to stream from bridge server 410. Bridge server 410 will aggregate all the relevant windows for that application and stream them to client 100.

Figure 12:
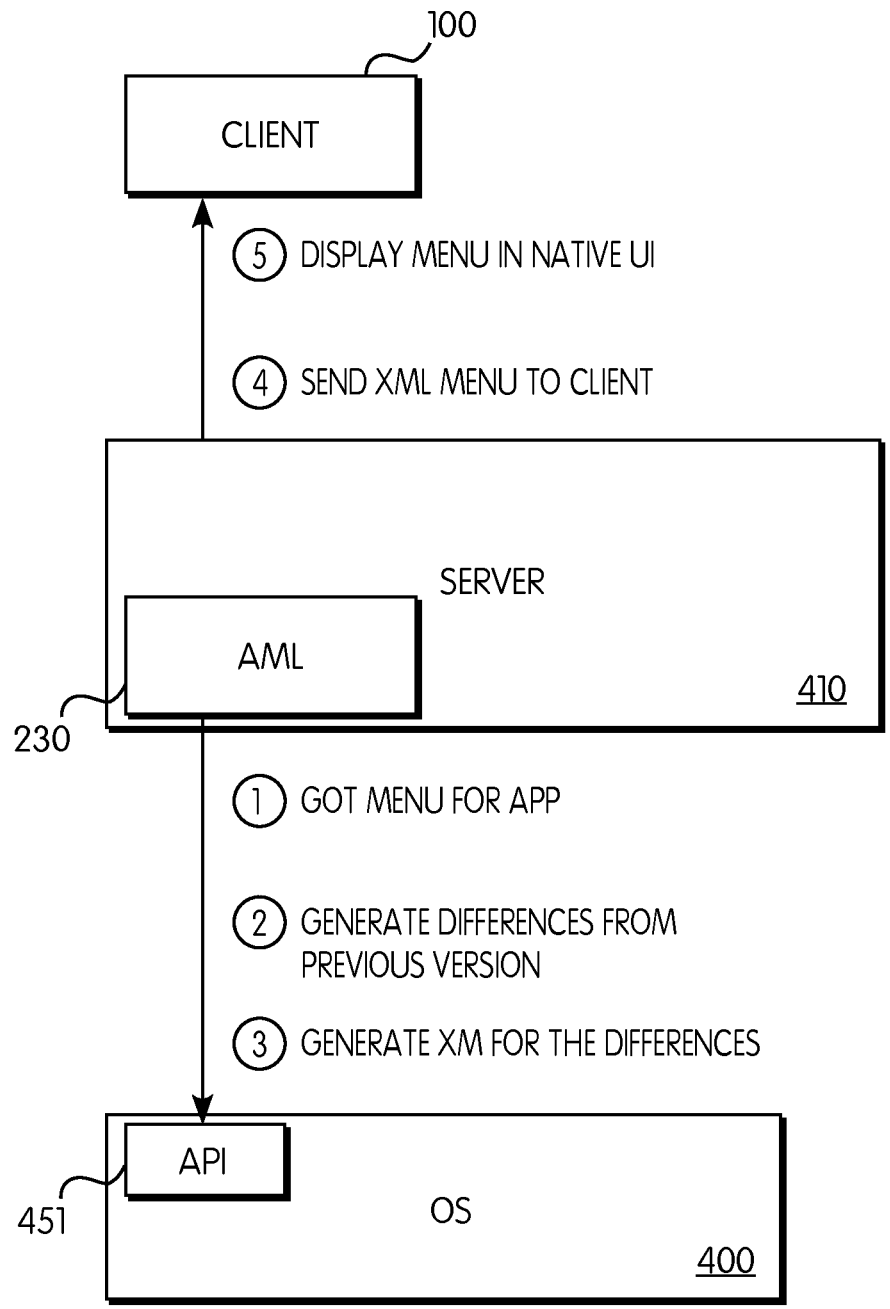
FIG. 12 is an example showing menu virtualization.

The system is able to monitor application resources and provide local controls to interact more seamlessly with the application. For example, FIG. 12 shows a method for tracking application menus and changes to the menu and relaying the content to the client. The client may choose to display the menus using native UI elements that makes the user interaction with the menus seamless. An application monitoring element 230 of bridge server 410 cal API 415 of OS 400 to get the current menu configuration for an application. It then determines the difference between the current version and previous version and generates XML: for the difference. The XML is then sent to client 100 and the menus are displayed in the native user interface of client 100.

The application streaming function also provides a method to define preset user inputs to an application that perform a task. The presets can be saved as a macro and subsequently can be executed from the OS of client 100. For example, the user can record a set of mouse and keyboard events that should be sent to an application. Also provided is a method that provides a secure sandbox when sharing an application with other users. This enables the user to restrict files and other personal information from being viewed and used by other people and gives that user a space from which to read and write files. For example, the system may show fewer options to control the application based on whether the application is being shared by a friend or used by the owner.

Aggregation Bridge aggregator 412 runs of one of the servers 200a, 200b ... in the cluster (referred to as the "master node") and provides a mechanism that allows individual computers running bridge server software to be treated as a single cluster of computers from which the user can access application and data services. This may include applications and data hosted in the cloud, as was previously discussed. A list of available applications is stored by bridge aggregator 412 in database 414.

Figure 13:
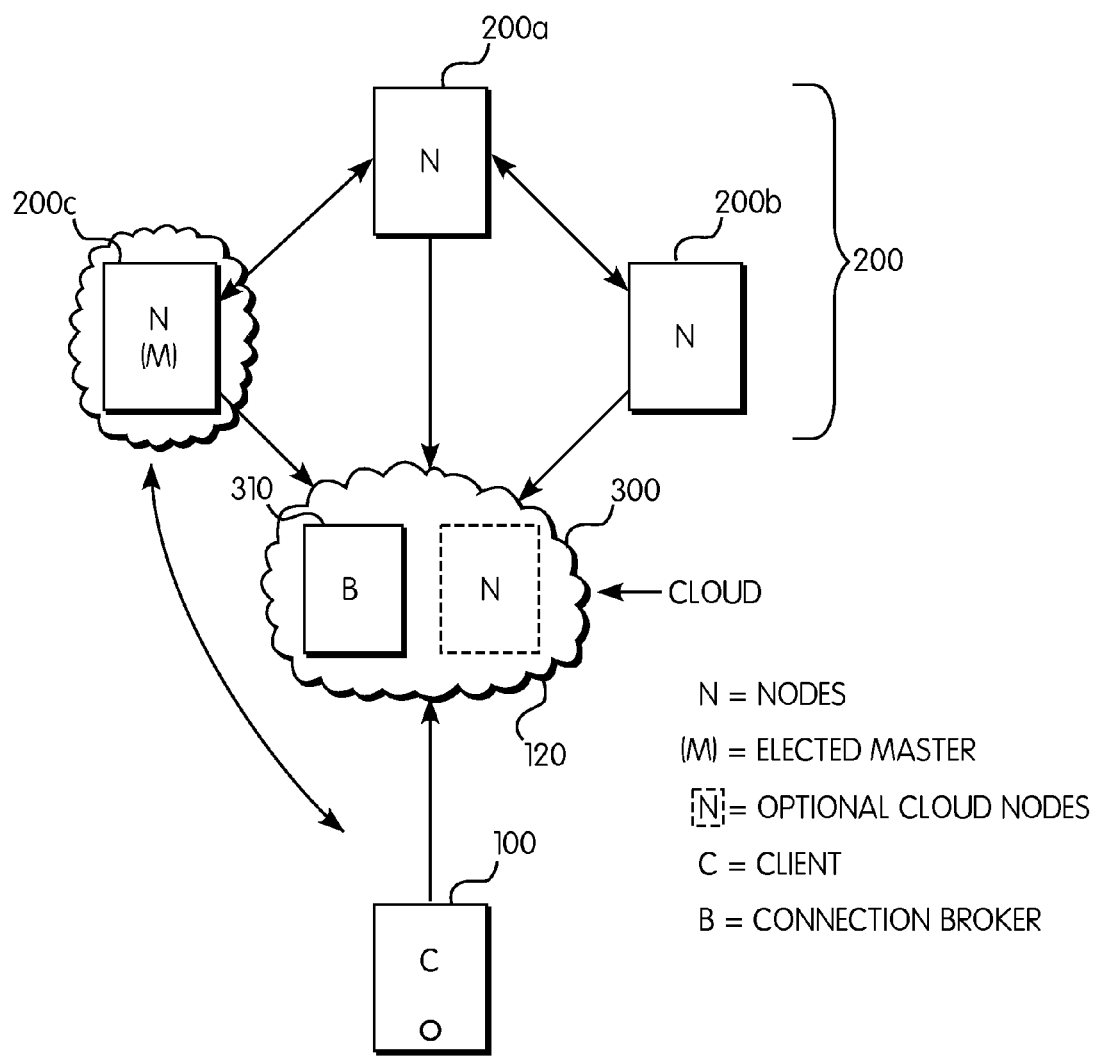
FIG. 13 shows a cluster connected to the main cloud showing the connection broker and the client accessing the cluster through the cloud.

A method to designate a computer running the "server" software as an aggregator that monitors applications and windows for itself and the other computers. FIG. 13 shows a cluster of computers consisting of 200a, 200b and 200c. Node 200c is has been designated as the "aggregator" and as such will monitor applications and windows for itself and the other computers. In addition, the aggregator also aggregates data exported by server applications and provides user authentication and authorization services. This forms a distributed cluster of the users' computers. The client connects to the designated server and expects the server to interact with other computers in the cluster and monitors the applications and windows on the computers in the cluster. This provides the client a uniform view of their applications and data.

Figure 14:
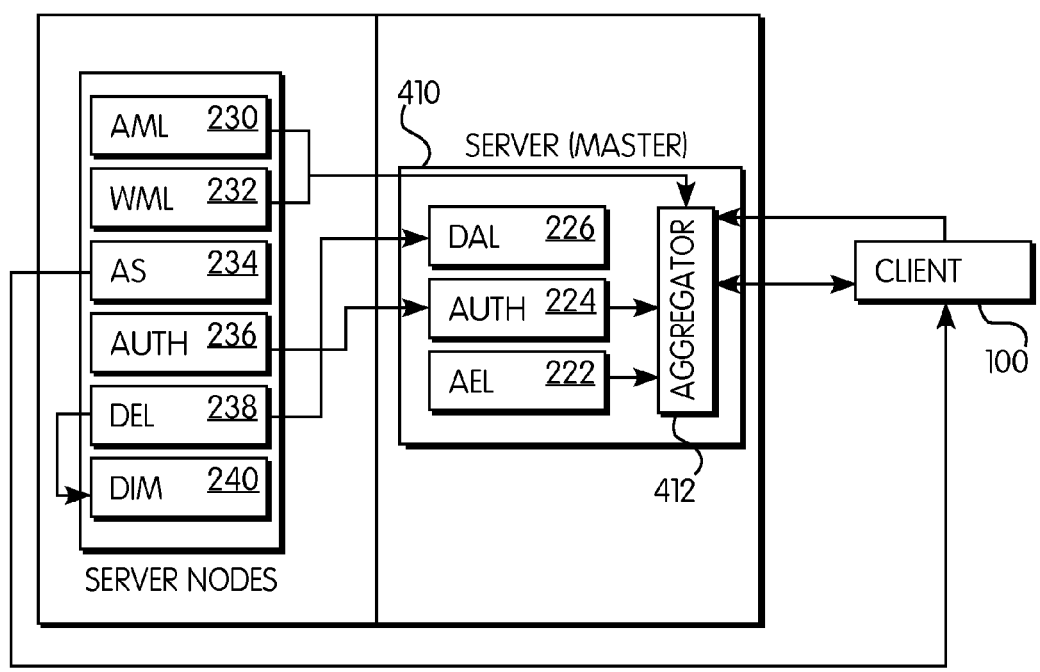
FIG. 14 shows the basic components of both a regular server and a server designated as an aggregator or master server.

FIG. 14 shows the additional functionality required of the bridge server 410 acting as the aggregator, and running the aggregator software 412. The master node helps aggregate data and application and window remoting services. The server application running in each of the nodes has Application Monitoring (AML) 230 and Window Monitoring (WML) 232 functionality. These capabilities are aggregated through the aggregator functionality running on the master node. Likewise, each node implements Data Import (DIM) 240 and Data Export (DEL) 238 functionality which makes the users' file and data on the local nodes accessible from the master node. The master node implements a Data Aggregation layer (DAL) 226 which aggregates users' data from multiple nodes and presents it to a remote desktop user via a virtualized application layer. User authentication services are an essential part of the system and are implemented both in the master node and cluster nodes to provide safe access to user's data and window/application remoting services.

The invention has been described by description of its functionality and, as is recognized by those of skill in the art, many implementations of such functionality are possible. The invention is meant to cover all possible implementations of the functionality, regardless of language, platform or architecture. The attached claims set forth the scope of the invention and specific implementation details are not meant to be read into the claims.

We claim:

1. A system for the remote streaming of applications, comprising:
   a. a server, running server software which discovers applications running on one or more servers to be made available to one or more remote clients; said server software aggregating a list of said applications and sending said list to said one or more clients; and
   b. a client, running client software which receives said list of applications and renders said list using the native user interface of said client, said list of applications appearing to a user of said client to be running on a single virtual server, said virtual server consisting of a cluster of one or more physical servers, said client software allowing the selection of one or more applications to be run by said client remotely on said server and streamed to said client.

2. The system of claim 1 wherein said client software provides a search capability allowing the querying of said virtual server for applications to be run or documents to be opened using a particular application.

3. The system of claim 2 wherein said one or more clients communicates with said virtual server using a peer-to-peer protocol.

4. The system of claim 2 wherein said one or more clients communicates with said virtual server using a social cloud as an intermediary.

5. The system of claim 1 wherein some of said applications available to be run on said virtual server are being served by a social cloud.

6. The system of claim 5 wherein said applications running on a server may be shared with one or more authorized users.

7. The system of claim 6 wherein said social cloud may facilitate the identification of said authorized users.

8. The system of claim 1 wherein said server software may adjust the priority of processes running on any server in said cluster of servers to maintain a level of quality of service for streaming applications.

9. The system of claim 1 wherein a server running one or more of said streamed applications monitors the status of windows appearing on the desktop of said server for said streamed application and communicates said information to clients to which said application is being streamed.

10. The system of claim 1 wherein said server software monitors the type and content of windows belonging to streamed applications and decides if said windows should be streamed to said clients or virtualized by clients for display in the native user interface of said client.

11. The system of claim 10 wherein said client communicates its display capabilities to said server.

12. The system of claim 11 wherein said software server virtualizes windows of a streamed application by:
   a. disassembling said windows into user interface elements;
   b. encoding said user elements; and
   c. sending said encoded user interface elements to said client streaming said application for decoding and assembly using native user interface elements of said client.

13. The system of claim 11 wherein said server software monitors streamed applications for changes to all application-related windows and streams said client to which said application is being streamed.

14. The system of claim 1 wherein one server in said cluster of servers is designated as the aggregator, said aggregator discovering applications on all of the servers in said cluster which are available for streaming and for presenting said available applications to said client as though running on a single virtual server.

15. The system of claim 14 wherein said aggregator server facilitates the exchange of data between said clients and the servers in said server cluster and provides user authentication and authorization services.

16. The system of claim 15 wherein said aggregator server facilitates the streaming of application and the exchange of data between other server in said server cluster and said clients.

17. The system of claim 15 wherein said aggregator server takes requests from a client for the opening of a file of a particular type and finds an application on one or more of the servers in said cluster the can open said file and streams said application to the client requesting the opening of said file.

18. The system of claim 1 wherein said server software further provides the function of
    monitoring applications streamed to said clients and throttling of said applications to preserve quality of service for streamed applications.

19. The system of claim 1 wherein said server software further provides the function of monitoring windows associated with streamed applications and the communication of the status changes in said windows to said clients.

20. The system of claim 1 wherein said applications are streamed to said clients with the user interfaces of said applications being directly streamed or virtualized by said client in the native user interface of said client.

\* \* \* \* \*